(12) United States Patent
Lee et al.

(10) Patent No.: US 12,293,486 B2
(45) Date of Patent: May 6, 2025

(54) IMAGE PROCESSING METHOD, IMAGE PROCESSING SYSTEM, AND NON-TRANSITORY COMPUTER READABLE STORAGE MEDIUM FOR PROCESSING IMAGE WITH ONE OR MORE BRIGHTNESS RANGES

(71) Applicant: Realtek Semiconductor Corporation, Hsinchu (TW)

(72) Inventors: Kung Ho Lee, Hsinchu (TW); Yu Cheng Cheng, Hsinchu (TW); Jia Wei Wu, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 485 days.

(21) Appl. No.: 17/663,829

(22) Filed: May 18, 2022

(65) Prior Publication Data
US 2023/0186442 A1    Jun. 15, 2023

(30) Foreign Application Priority Data
Dec. 10, 2021  (TW) .................... 110146447

(51) Int. Cl.
*G06T 5/40* (2006.01)
*G06T 1/20* (2006.01)
(Continued)

(52) U.S. Cl.
CPC ............ *G06T 5/40* (2013.01); *G06T 1/20* (2013.01); *G06T 7/13* (2017.01); *G06T 7/50* (2017.01); *G06T 11/00* (2013.01)

(58) Field of Classification Search
None
See application file for complete search history.

(56) References Cited

U.S. PATENT DOCUMENTS

2003/0152266 A1* 8/2003 Ivers .................. G06T 5/92
382/169
2008/0056567 A1* 3/2008 Kwon .................. G06T 5/40
382/168

(Continued)

FOREIGN PATENT DOCUMENTS

CN   112633070 A  *  4/2021
TW   202013332 A  *  4/2020

OTHER PUBLICATIONS

CN.112633070.A English Translation, Hu et al., Figs 1-5, par 0015-0020, 0030-0040, 0080-0081 (Year: 2021).*
(Continued)

*Primary Examiner* — Miya J Cato
(74) *Attorney, Agent, or Firm* — CKC & Partners Co., LLC

(57) ABSTRACT

An image processing method includes following operations: generating, by a processor, a sliding window for a target pixel in a plurality of pixels in image data; generating, by the processor, an original brightness histogram of the sliding window according to an original bit depth; generating, by the processor, a low-bit-depth brightness histogram of the sliding window according to a low bit depth; determining, by the processor, a target low-bit-depth range from the low-bit-depth brightness histogram according to the target pixel; extracting, by the processor, a partial original brightness histogram from the original brightness histogram according to the target low-bit-depth range; and performing, by the processor, a histogram equalization process on the partial original brightness histogram according to the original bit depth to generate a final brightness value of the target pixel.

18 Claims, 8 Drawing Sheets

(51) Int. Cl.
  *G06T 7/13* (2017.01)
  *G06T 7/50* (2017.01)
  *G06T 11/00* (2006.01)

(56) References Cited

U.S. PATENT DOCUMENTS

| | | | |
|---|---|---|---|
| 2012/0141028 A1* | 6/2012 | Choi | H04N 23/70 |
| | | | 382/169 |
| 2020/0089972 A1* | 3/2020 | Yu | B60K 35/00 |
| 2020/0134795 A1* | 4/2020 | Zhang | H04N 23/60 |
| 2022/0237755 A1* | 7/2022 | Yang | G06T 5/40 |

OTHER PUBLICATIONS

TW.202013332.A English Translation, Chu et al., Highlighted Text pp. 2-4 (Year: 2020).*

Wikipedia, "Histogram equalization", retrieved from https://en.wikipedia.org/wiki/Histogram_equalization, May 17, 2022.

* cited by examiner

IMAGE PROCESSING METHOD, IMAGE PROCESSING SYSTEM, AND NON-TRANSITORY COMPUTER READABLE STORAGE MEDIUM FOR PROCESSING IMAGE WITH ONE OR MORE BRIGHTNESS RANGES

RELATED APPLICATIONS

This application claims priority to Taiwanese Application Serial Number 110146447, filed Dec. 10, 2021, which is herein incorporated by reference.

BACKGROUND

Technical Field

The present disclosure relates to image processing technology. More particularly, the present disclosure relates to an image processing method, an image processing system, and a non-transitory computer readable storage medium.

Description of Related Art

With developments of technology, various image processing methods have been developed. In the various image processing methods, the histogram equalization process can be used to enhance the contrast of one image to improve the visibility of the image. However, some current histogram equalization processes are unsuitable for the images with only one brightness range or with more than two brightness ranges, or require a large amount of calculation.

SUMMARY

Some aspects of the present disclosure are to provide an image processing method. The image processing method includes following operations: generating, by a processor, a sliding window for a target pixel in a plurality of pixels in image data; generating, by the processor, an original brightness histogram of the sliding window according to an original bit depth; generating, by the processor, a low-bit-depth brightness histogram of the sliding window according to a low bit depth; determining, by the processor, a target low-bit-depth range from the low-bit-depth brightness histogram according to the target pixel; extracting, by the processor, a partial original brightness histogram from the original brightness histogram according to the target low-bit-depth range; and performing, by the processor, a histogram equalization process on the partial original brightness histogram according to the original bit depth to generate a final brightness value of the target pixel.

Some aspects of the present disclosure are to provide an image processing system. The image processing system includes a memory and a processor. The memory is configured to store image data. The processor is configured to perform following operations: generating a sliding window for a target pixel in a plurality of pixels in image data; generating an original brightness histogram of the sliding window according to an original bit depth; generating a low-bit-depth brightness histogram of the sliding window according to a low bit depth; determining a target low-bit-depth range from the low-bit-depth brightness histogram according to the target pixel; extracting a partial original brightness histogram from the original brightness histogram according to the target low-bit-depth range; and performing, a histogram equalization process on the partial original brightness histogram according to the original bit depth to generate a final brightness value of the target pixel.

Some aspects of the present disclosure are to provide a non-transitory computer readable storage medium. The non-transitory computer readable storage medium stores one or more computer programs. The one or more computer programs include instructions and a processor is configured to execute the instructions. When the processor executes the instructions, the processor performs following operations: generating a sliding window for a target pixel in a plurality of pixels in image data; generating an original brightness histogram of the sliding window according to an original bit depth; generating a low-bit-depth brightness histogram of the sliding window according to a low bit depth; determining a target low-bit-depth range from the low-bit-depth brightness histogram according to the target pixel; extracting a partial original brightness histogram from the original brightness histogram according to the target low-bit-depth range; and performing, a histogram equalization process on the partial original brightness histogram according to the original bit depth to generate a final brightness value of the target pixel.

As described above, in the present disclosure, the low-bit-depth brightness histogram is generated first, the partial original brightness histogram is extracted from the original brightness histogram according to the target low-bit-depth range including the target pixel, and the histogram equalization process is performed on the extracted partial original brightness histogram according to the original bit depth. Accordingly, the present disclosure can be applied to the image with only one brightness range or with more than two brightness ranges, and can achieve the effect of reducing hardware area, reducing power consumption, or reducing the amount of calculation. In addition, since the process of generating the low-bit-depth brightness histogram also has the effect of low-pass filtering, there is no need to design additional low-pass filter circuit or to perform additional low-pass filtering calculation in the present disclosure.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled."

"Connected" or "coupled" may also refer to operations or actions between two or more elements.

Figure 1:
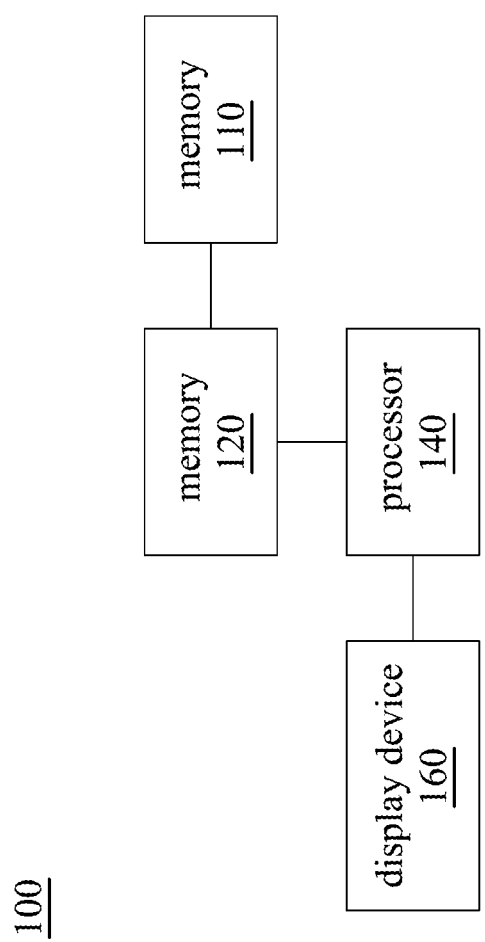
FIG. 1 is a schematic diagram of an image processing system according to some embodiments of the present disclosure.

Reference is made to FIG. 1. FIG. 1 is a schematic diagram of an image processing system 100 according to some embodiments of the present disclosure. As illustrated in FIG. 1, the image processing system 100 includes a memory 110, a memory 120, a processor 140, and a display device 160. The memory 110 is coupled to the memory 120. The processor 140 is coupled to the memory 120 and the display device 160.

In some embodiments, the memory 110 can be implemented by a Dynamic Random Access Memory (DRAM). The memory 120 can be implemented by a Static Random Access Memory (SRAM). The processor 140 can be implemented by a digital logic circuit. For example, the processor 140 can be a digital logic circuit which is designed by a register-transfer level (RTL) method. In other words, these embodiments are implemented by a digital hardware manner. The display device 160 can be implemented by a display panel or a touch display panel.

Figure 2:
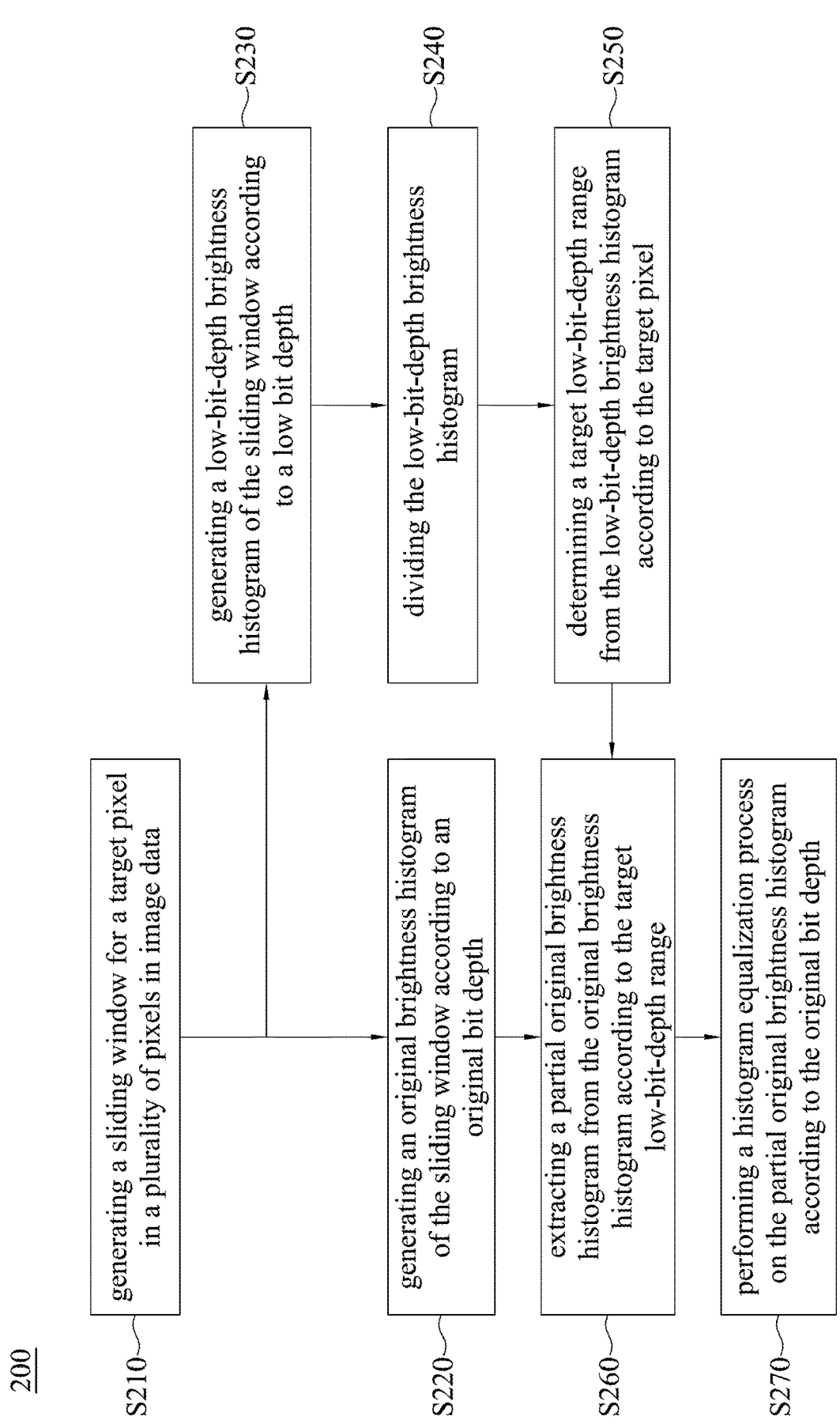
FIG. 2 is a flow diagram of an image processing method according to some embodiments of the present disclosure.

References are made to FIG. 1 and FIG. 2. FIG. 2 is a flow diagram of an image processing method 200 according to some embodiments of the present disclosure.

As illustrated in FIG. 2, the image processing method 200 includes operation S210, operation S220, operation S230, operation S240, operation S250, operation S260, and operation S270.

In some embodiments, the image processing method 200 can be implemented to the image processing system 100 in FIG. 1, but the present disclosure is not limited thereto. For better understanding, following paragraphs are described with reference with FIG. 1.

Figure 3:
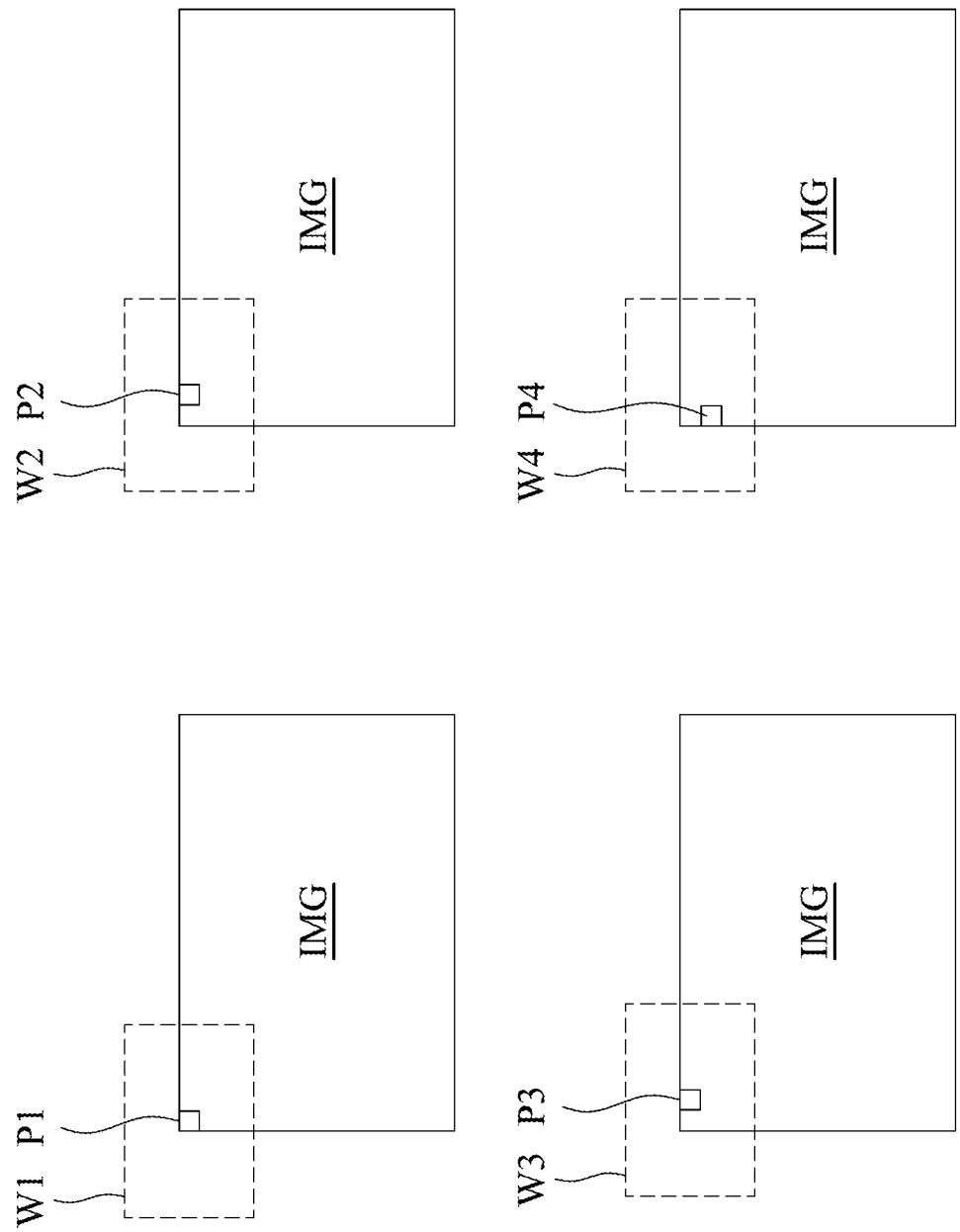
FIG. 3 is a schematic diagram of one operation in FIG. 2 according to some embodiments of the present disclosure.

Reference is also made to FIG. 3. FIG. 3 is a schematic diagram of operation S210 in FIG. 2 according to some embodiments of the present disclosure. In operation S210, the processor 140 generates sliding windows W1-W4 for target pixels P1-P4 in pixels in image data IMG respectively, in which the pixel P1 is disposed at a first row and a first column, the pixel P2 is disposed at the first row and a second column, the pixel P3 is disposed at the first row and a third column, and the pixel P4 is disposed at a second row and the first column. In some embodiments, the memory 110 is configured to store the entire image data IMG, and the memory 120 is configured to temporarily store local image data. For example, when it intends to generate the sliding window W1, the image data in the range of the sliding window W1 is transmit from the memory 110 to the memory 120 and is temporarily stored in the memory 120 for the processor 140 to process. Since the image data in the range of the sliding window W1 is stored in the memory 120 in row by row (line by line) manner, the memory 120 works as a line buffer.

As illustrated in FIG. 3, at first, the processor 140 determines the sliding window W1 according to the target pixel P1, in which the target pixel P1 is disposed at the center of the sliding window W1. The sliding window W1 can be in a shape of a rectangle. The length or the width of the sliding window W1 can be designed according to actual requirements. The brightness values in the sliding window W1 but outside the image data IMG can be compensated by a repeating method, a zero padding method, or a mapping method.

Then, the processor 140 can determine the sliding windows W2-W4 according to the target pixels P2-P4 respectively, in which the target pixels P2-P4 are disposed at the centers of the sliding windows W2-W4 respectively. Similarly, the brightness values in the sliding windows W2-W4 but outside the image data IMG can be compensated by the repeating method, the zero padding method, or the mapping method.

For ease and better understanding, FIG. 3 merely takes four target pixels P1-P4 of the image data ING as an example, and other pixels have similar operations. By applying the operations above to all pixels in the image data IMG, it can acquire the sliding windows of the all pixels in the image data IMG.

The following paragraphs take the target pixel P1 and the corresponding sliding window W1 as an example, and other pixels have similar operations.

Figure 4:
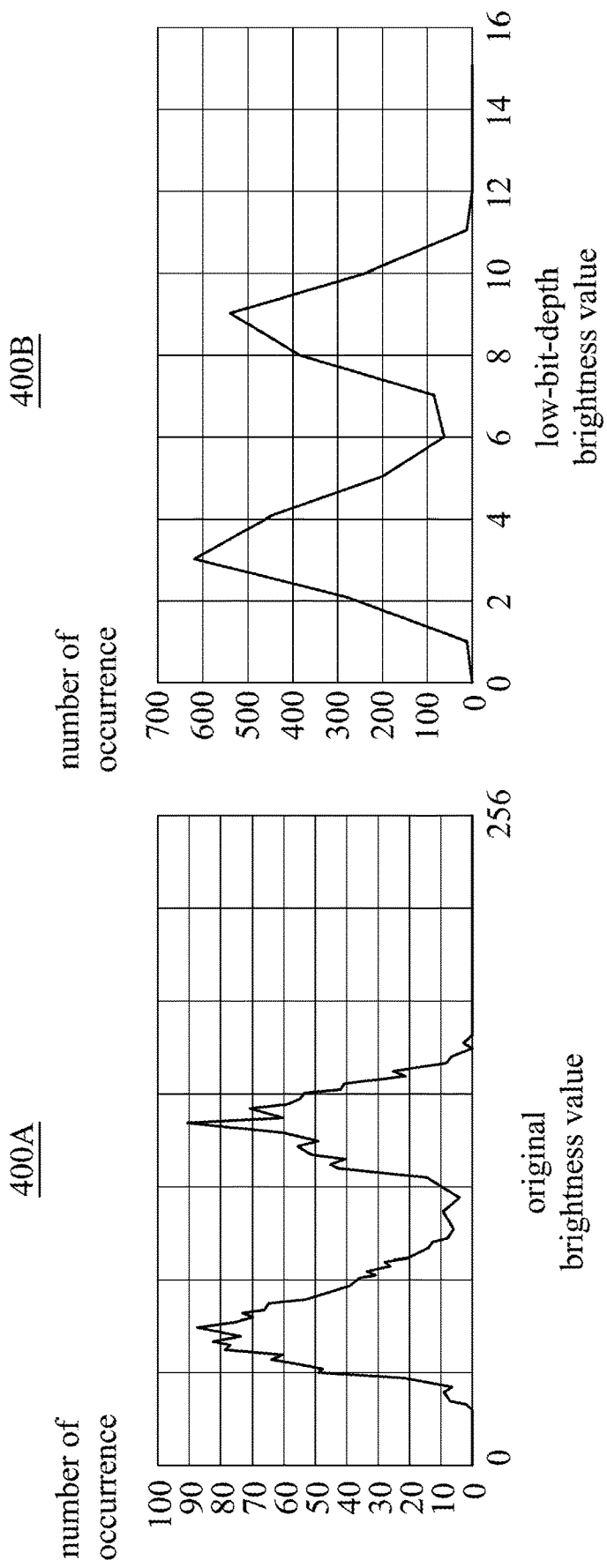
FIG. 4 is a schematic diagram of an original brightness histogram and a low-bit-depth brightness histogram according to some embodiments of the present disclosure.

Reference is made to FIG. 4. FIG. 4 is a schematic diagram of an original brightness histogram 400A and a low-bit-depth brightness histogram 400B according to some embodiments of the present disclosure.

In operation S220, the processor 140 generates the original brightness histogram 400A of the sliding window W1 according to an original bit depth. In some embodiments, the original bit depth corresponds, for example, 8 bits, but the present disclosure is not limited thereto. In other words, when the original bit depth corresponds 8 bits, an original brightness value of each of the pixels corresponds 256 (i.e., $2^8$) levels (e.g., 0-255 levels). The processor 140 can generate the original brightness histogram 400A according to the original brightness values (original bit depth) of the all pixels in the sliding window W1.

In operation S230, the processor 140 generates the low-bit-depth brightness histogram 400B of the sliding window W1 according to the low bit depth. In some embodiments, the low bit depth is smaller than the original bit depth. For example, the low bit depth corresponds, for example, 4 bits, but the present disclosure is not limited thereto. In other words, when the low bit depth corresponds 4 bits, a low-bit-depth brightness value of each of the pixels corresponds 16 (i.e., $2^4$) levels (e.g., 0-15 levels). In some embodiments, the processor 140 can divide the original brightness value of each pixel by 16 and perform a round down process to acquire the low-bit-depth brightness value of the each pixel. However, based on the round down process above, when an original brightness value is an integer in a range from 48 to 63, the corresponding low-bit-depth brightness value is 4. Then, the processor 140 can generate the low-bit-depth brightness histogram 400B according to the low-bit-depth brightness values (low-bit-depth) of all pixels in the sliding window W1. Operation S230 is a "down sampling" process. In other words, compared to the original brightness histogram 400A, lines in the low-bit-depth brightness histogram 400B change smoothly.

Figure 5:
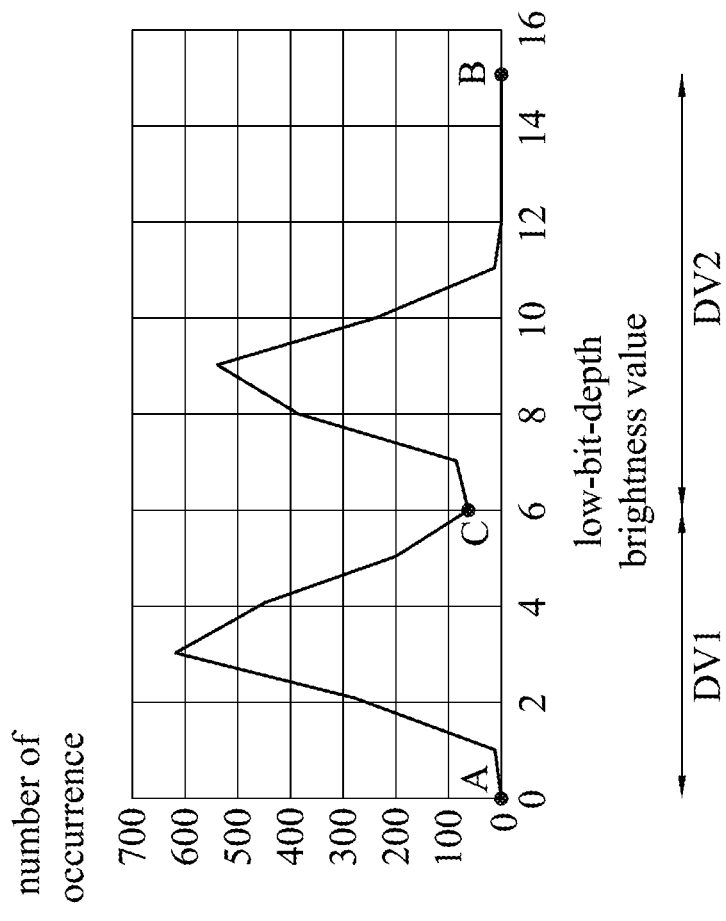
FIG. 5 is a schematic diagram of one operation in FIG. 2 according to some embodiments of the present disclosure.

Reference is made to FIG. 5. FIG. 5 is a schematic diagram of operation S240 in FIG. 2 according to some embodiments of the present disclosure. In operation S240, the processor 140 divides the low-bit-depth brightness histogram 400B.

In some embodiments, the processor 140 can determine two boundary points A-B and a local boundary point C corresponding to at least one local minimum value in the low-bit-depth brightness histogram 400B. Then, the processor 140 can divide the low-bit-depth brightness histogram 400B into a low-bit-depth range DV1 and a low-bit-depth range DV2 according to the brightness values (e.g., a gray-scale value 0 and a gray-scale value 15) corresponding to the two boundary points A-B and a brightness value (e.g., a gray-scale value 6) corresponding to the local boundary point C. The low-bit-depth range DV1 covers a range from the boundary point A to the local boundary point C. The low-bit-depth range DV2 covers a range from the local boundary point C to the boundary point B.

In some embodiments, the vertical axis value N of the local boundary point C meets the following two conditions:

$N \leq (N-1)$ and $N \leq (N+1)$            condition 1

$N(\neq N=1)$ and $N \neq (N+1)$            condition 2 in which N is the vertical axis value (number of occurrence) of the local boundary point C (i.e., there are N pixels having the brightness value corresponding to the local boundary point C), (N+1) is the vertical axis value (number of occurrence) of a right-hand side point adjacent to the local boundary point C, and (N−1) is the vertical axis value (number of occurrence) of a left-hand side point adjacent to the local boundary point C.

Figure 6:
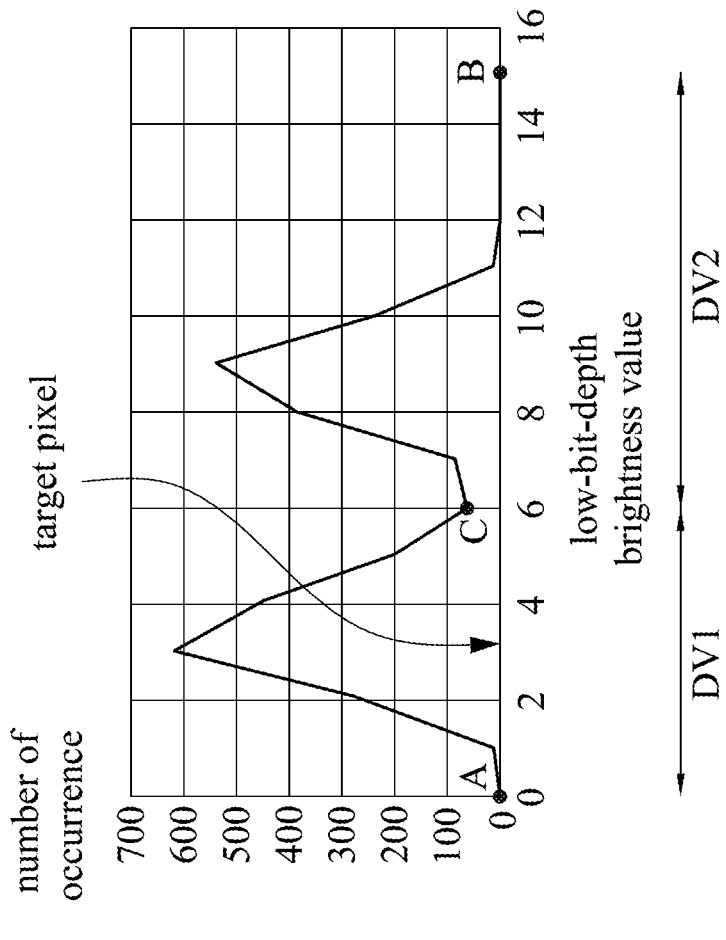
FIG. 6 is a schematic diagram of one operation in FIG. 2 according to some embodiments of the present disclosure.

Reference is made to FIG. 6. FIG. 6 is a schematic diagram of operation S250 in FIG. 2 according to some embodiments of the present disclosure.

In operation S250, the processor 140 determines the low-bit-depth range DV1 from the low-bit-depth brightness histogram 400B according to the target pixel P1. As illustrated in FIG. 6, since the low-bit-depth brightness value of the target pixel P1 is in the low-bit-depth range DV1, the processor 140 determines that the low-bit-depth range DV1 is the target low-bit-depth range.

Figure 7:
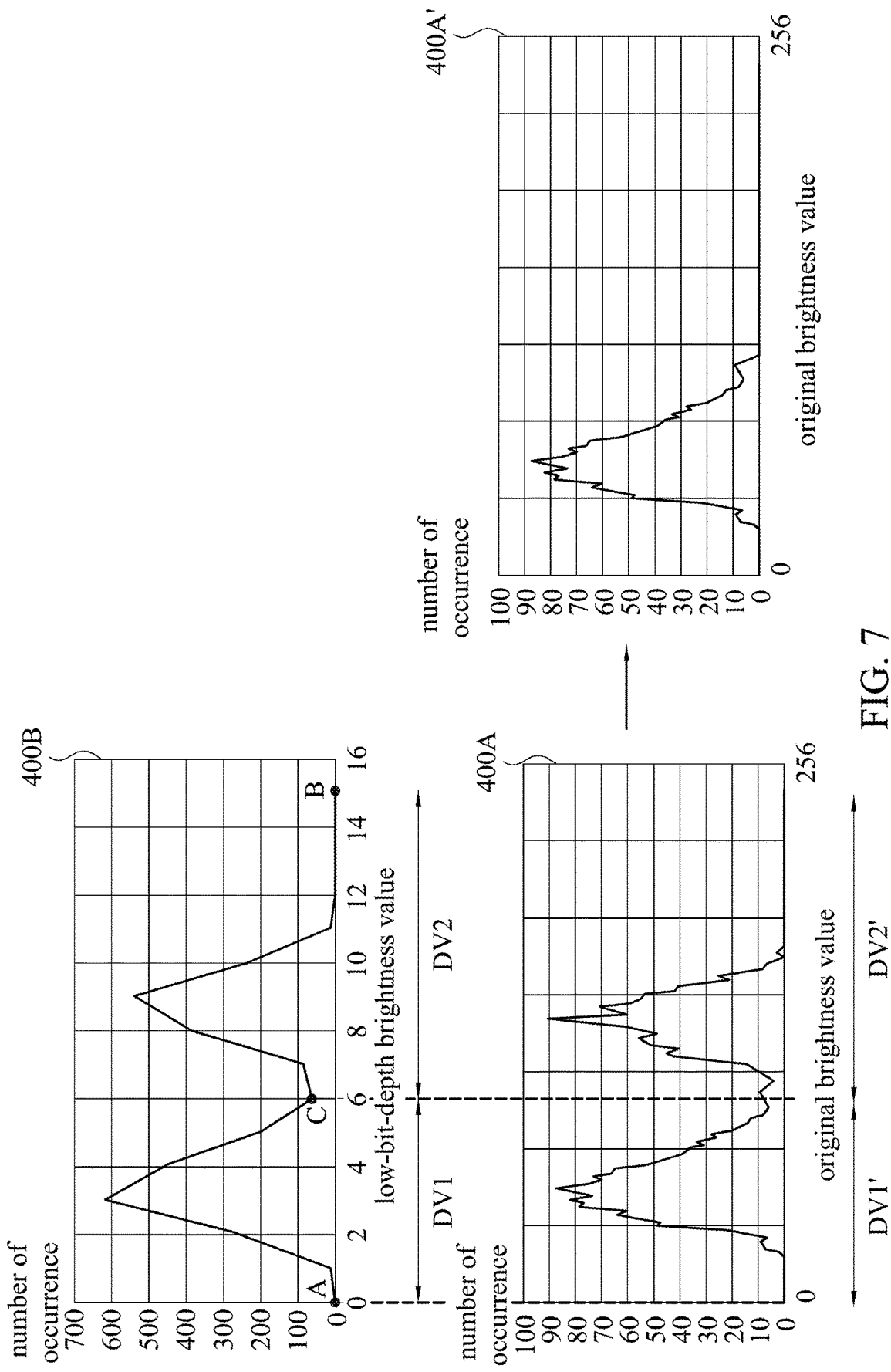
FIG. 7 is a schematic diagram of one operation in FIG. 2 according to some embodiments of the present disclosure.

Reference is made to FIG. 7. FIG. 7 is a schematic diagram of operation S260 in FIG. 2 according to some embodiments of the present disclosure.

In operation S260, the processor 140 can extract the partial original brightness histogram 400A' from the original brightness histogram 400A according to the target low-bit-depth range DV1. In some embodiments, the processor 140 can align (map) the low-bit-depth brightness histogram 400B with the original brightness histogram 400A. As illustrated in FIG. 7, according to the low-bit-depth range DV1 and the low-bit-depth range DV2, the original brightness histogram 400A can be divided into an original-bit-depth range DV1' and an original-bit-depth range DV2', in which the original-bit-depth range DV1' corresponds to the low-bit-depth range DV1, and the original-bit-depth range DV2' corresponds to the low-bit-depth range DV2. Then, the processor 140 can extract the original-bit-depth range DV1' from the original brightness histogram 400A according to the determined target low-bit-depth range DV1 in operation S250 to be the partial original brightness histogram 400A'. In other words, the original-bit-depth range DV1' is remained in the partial original brightness histogram 400A', and the original-bit-depth range DV2' is removed. For example, the vertical axis values (number of occurrence) in the original-bit-depth range DV2' can be set to be 0.

In operation S270, the processor 140 performs the histogram equalization process on the partial original brightness histogram 400A' according to the original bit depth to generate a final brightness value of the target pixel P1. Since the partial original brightness histogram 400A' corresponds to the original bit depth (e.g., 8-bit depth/256 levels), the processor 140 performs the histogram equalization process on the partial original brightness histogram 400A' according to the original bit depth to generate the final brightness value of the target pixel P1. Then, the processor 140 generates a final image according to the final brightness values of the pixels for the display device 160 to display. The detailed operations of the histogram equalization process are described in following paragraphs.

First, the processor 140 performs a cumulative distribution function (CDF) process on the partial original brightness histogram 400A' to calculate cumulative distribution function values of all gray-scale values in the partial original brightness histogram 400A'.

Then, the processor 140 acquires the equalized gray-scale values according to formula (1):

$$newHist(n) = \text{round}\left(\frac{cdf(n) - cdf_{min}}{cdf_{max} - cdf_{min}} \times (L-1)\right) \quad (1)$$

in which L is a level number corresponding to the original bit depth (L is 256 when the original bit depth corresponds to 8 bits), $cdf_{min}$ is a minimum value among all non-zero values in the cumulative distribution function values, $cdf_{max}$ is a maximum value among all non-zero values in the cumulative distribution function values, cdf(n) is a target gray-scale value (before equalization) in the partial original brightness histogram 400A' and n is an index value, newHist (n) is a new equalized gray-scale value of the target gray-scale value, the round function performs a round off process on the values such that the final values are integer values.

In the present disclosure, the histogram equalization process is performed on the partial original brightness histogram 400A' which corresponds to the original bit depth. Accordingly, the present disclosure can still obtain a higher resolution range.

Some related approaches (e.g., Otsu binarization approach) need a large amount of recursion calculation and the brightness histogram is merely divided into two ranges. These approaches are unsuitable for the images with only one brightness range or with more than two brightness ranges.

Some other approaches directly scan all local minimum values in the original brightness histogram which corresponds to the original bit depth. However, as the original bit depth becomes deeper and deeper, the amount of scanning or calculation for the original brightness histogram becomes larger and larger. These are not conducive for the image processing process.

Compared to the aforementioned approaches, in the present disclosure, the processor 140 generates the low-bit-depth histogram first, extracts the partial original brightness histogram 400A' from the original brightness histogram 400A according to the target low-bit-depth range DV1 including the target pixel P1, performs the histogram equalization process on the partial original brightness histogram 400A' according to the original bit depth. Since the low-bit-depth ranges in the present disclosure are not limited to only two (although FIG. 5 takes two low-bit-depth ranges DV1-DV2 as an example), the present disclosure can be applied to the image with more than two brightness ranges.

In addition, as described above, the process of changing from the original bit depth to the low bit depth in operation S230 can be regarded as "down-sampling." Compared to the original brightness histogram 400A, it takes less calculation to find the local boundary point C corresponding to the local minimum values on the low-bit-depth brightness histogram 400B. Accordingly, the processor 140 in the present disclosure occupies a smaller hardware area (e.g., the numbers of comparators, multiplexers, adders, and multipliers used to find the local minimum values and perform the low-pass filtering process can be reduced) and has low power consumption. In addition, since the low-bit-depth brightness histogram 400B is relatively smooth, it can avoid irrelevant noise.

In addition, since "down-sampling" has the effect of low-pass filtering, the processor 140 can be designed without additional low-pass filter circuit or without additional low-pass filtering calculation.

Reference is made to FIG. 7 again. In some embodiments, the process of aligning (mapping) the low-bit-depth brightness histogram 400B with the original brightness histogram 400A by the processor 140 in aforementioned operation S260 further includes performing a boundary adjustment process according to the original bit depth.

As illustrated in FIG. 7, since the low-bit-depth range DV1 in the low-bit-depth brightness histogram 400B is used to extract the partial original brightness histogram 400A', the processor 140 can perform the boundary adjustment process on the local boundary point C (the low-bit-depth brightness is 6) which is at the right-hand side of the low-bit-depth range DV1.

As described above, the low-bit-depth brightness value is acquired by dividing the original brightness value by 16 and performing the round down process. Effectively, one low-bit-depth brightness value (e.g., 6) corresponds to multiple original brightness values (e.g., integers from 96 to 111). In this situation, when the low-bit-depth brightness value (e.g., 6) of the local boundary point C is multiplied by 16 to acquire the corresponding gray-scale value in the original brightness histogram 400A, only one integer (e.g., 96) is acquired and other integers (e.g., 97-111) are not covered.

Based on problems above, the processor 140 performs the boundary adjustment process according to formula (2) below:

$$S2 = S1 \times 2^{(N2-N1)} + (2^{(N2-N1)} - 1) \quad (2)$$

in which S1 is the gray-scale value of one boundary point in the low-bit-depth brightness histogram 400B, N2 is the original bit depth, N1 is the low bit depth, and S2 is the corresponding gray-scale value in the original brightness histogram 400A.

As illustrated in FIG. 7, the local boundary point C has the gray-scale value 6 (i.e., S1), the original bit depth corresponds, for example, 8 (i.e., S2), and the low bit depth corresponds, for example, 4 (i.e., N1). Based on formula (2) above, P2 is 111. In other words, the local boundary point C in the low-bit-depth brightness histogram 400B is aligned to the gray-scale value 111 in the original brightness histogram 400A. Accordingly, 97-111 can be covered to extract appropriate the original-bit-depth range DV1' from the original brightness histogram 400A.

The above description of the image processing method 200 includes exemplary operations, but the operations of the image processing method 200 are not necessarily performed in the order described. The order of the operations of the image processing method 200 disclosed in the present disclosure are able to be changed, or the operations are able to be executed simultaneously or partially simultaneously as appropriate, in accordance with the spirit and scope of various embodiments of the present disclosure.

Figure 8:
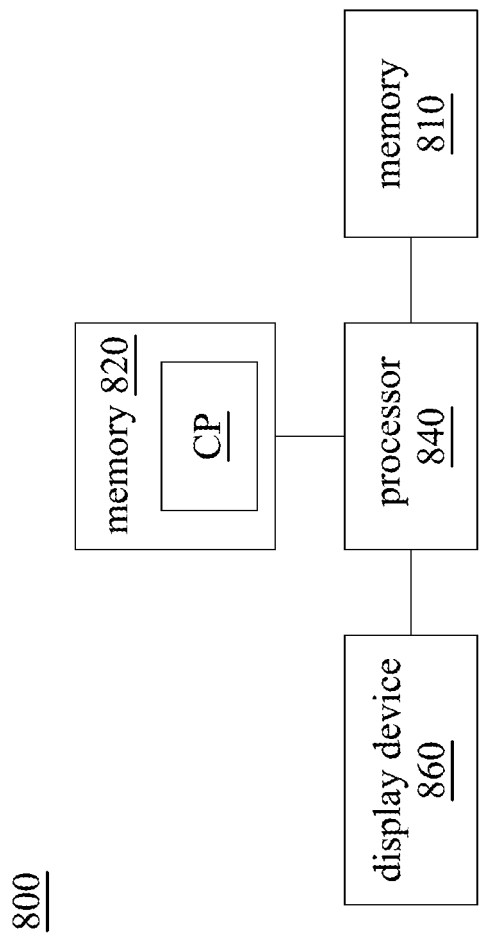
FIG. 8 is a schematic diagram of an image processing system according to some embodiments of the present disclosure.

Reference is made to FIG. 8. FIG. 8 is a schematic diagram of an image processing system 800 according to some embodiments of the present disclosure. In some embodiments, the image processing method 200 can be implemented to the image processing system 800 in FIG. 8.

As illustrated in FIG. 8, the image processing system 800 includes a memory 810, a memory 820, a processor 840, and a display device 860. The processor 840 is coupled to the memory 810, the memory 820, and the display device 860.

In some embodiments, the memory 810 can be implemented by a dynamic random access memory to store the aforementioned image data IMG. The memory 820 can be implemented by a non-transitory computer readable storage medium and configured to store one or more computer programs CP including a plurality of instructions. The processor 840 can be implemented by a central processor or a microprocessor. When the computer programs CP is executed by the processor 840, the aforementioned image processing method 200 is performed. In other words, these embodiments utilize a software manner to implement the image processing method 200. The display device 860 can be implemented by a display panel or a touch display panel.

In the embodiments which are mainly implemented by software, it can be applied to the image with more than two brightness ranges, can reduce the amount of calculation, and can improve the calculation speed. In addition, there is no need to perform additional low-pass filtering calculation.

As described above, in the present disclosure, the low-bit-depth brightness histogram is generated first, the partial original brightness histogram is extracted from the original brightness histogram according to the target low-bit-depth range including the target pixel, and the histogram equalization process is performed on the extracted partial original brightness histogram according to the original bit depth. Accordingly, the present disclosure can be applied to the image with only one brightness range or with more than two brightness ranges, and can achieve the effect of reducing hardware area, reducing power consumption, or reducing the amount of calculation. In addition, since the process of generating the low-bit-depth brightness histogram also has the effect of low-pass filtering, there is no need to design additional low-pass filter circuit or to perform additional low-pass filtering calculation in the present disclosure.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image processing method, comprising:
generating, by a processor, a sliding window for a target pixel in a plurality of pixels in image data;
generating, by the processor, an original brightness histogram of the sliding window according to an original bit depth;
generating, by the processor, a low-bit-depth brightness histogram of the sliding window according to a low bit depth;
determining, by the processor, a target low-bit-depth range from the low-bit-depth brightness histogram according to the target pixel;
extracting, by the processor, a partial original brightness histogram from the original brightness histogram according to the target low-bit-depth range; and
performing, by the processor, a histogram equalization process on the partial original brightness histogram according to the original bit depth to generate a final brightness value of the target pixel.

2. The image processing method of claim 1, wherein the low bit depth is smaller than the original bit depth.

3. The image processing method of claim 1, wherein determining, by the processor, the target low-bit-depth range from the low-bit-depth brightness histogram according to the target pixel comprises:
determining, by the processor, a plurality of boundary points and a local boundary point corresponding to at least one local minimum value according to the low-bit-depth brightness histogram;
determining, by the processor, a plurality of low-bit-depth ranges according to the boundary points and the local boundary point; and
determining, by the processor, the target low-bit-depth range from the low-bit-depth ranges according to a low-bit-depth brightness value of the target pixel.

4. The image processing method of claim 1, further comprising:
performing, by the processor, a boundary adjustment process according to the original bit depth.

5. The image processing method of claim 4, wherein the processor performs the boundary adjustment process according to:

$$S2 = S1 \times 2^{(N2-N1)} + (2^{(N2-N1)} - 1)$$

wherein S1 is a gray-scale value of a boundary point in the low-bit-depth brightness histogram, N2 is the original bit depth, N1 is the low bit depth, and S2 is a corresponding gray-scale value in the original brightness histogram.

6. The image processing method of claim 1, further comprising:
generating, by the processor, a final image according to the final brightness value of each of the pixels for a display device to display.

7. An image processing system, comprising:
a memory configured to store image data; and
a processor configured to perform following operations:
generating a sliding window for a target pixel in a plurality of pixels in image data;
generating an original brightness histogram of the sliding window according to an original bit depth;
generating a low-bit-depth brightness histogram of the sliding window according to a low bit depth;
determining a target low-bit-depth range from the low-bit-depth brightness histogram according to the target pixel;
extracting a partial original brightness histogram from the original brightness histogram according to the target low-bit-depth range; and
performing a histogram equalization process on the partial original brightness histogram according to the original bit depth to generate a final brightness value of the target pixel.

8. The image processing system of claim 7, wherein the processor is a digital logic circuit designed by a register-transfer level method, and the memory is a line buffer.

9. The image processing system of claim 7, wherein the low bit depth is smaller than the original bit depth.

10. The image processing system of claim 7, wherein the processor is further configured to perform following operations:
determining a plurality of boundary points and a local boundary point corresponding to at least one local minimum value according to the low-bit-depth brightness histogram;
determining a plurality of low-bit-depth ranges according to the boundary points and the local boundary point; and
determining the target low-bit-depth range from the low-bit-depth ranges according to a low-bit-depth brightness value of the target pixel.

11. The image processing system of claim 7, wherein the processor is further configured to perform following operation:
performing a boundary adjustment process according to the original bit depth.

12. The image processing system of claim 11, wherein the processor performs the boundary adjustment process according to:

$$S2 = S1 \times 2^{(N2-N1)} + (2^{(N2-N1)} - 1)$$

wherein S1 is a gray-scale value of a boundary point in the low-bit-depth brightness histogram, N2 is the original bit depth, N1 is the low bit depth, and S2 is a corresponding gray-scale value in the original brightness histogram.

13. The image processing system of claim 7, wherein the processor is configured to generate a final image according to the final brightness value of each of the pixels for a display device to display.

14. A non-transitory computer readable storage medium storing one or more programs, wherein the one or more programs comprise instructions and a processor is configured to execute the instructions, wherein when the processor executes the instructions, the processor performs following operations:
generating a sliding window for a target pixel in a plurality of pixels in image data;
generating an original brightness histogram of the sliding window according to an original bit depth;
generating a low-bit-depth brightness histogram of the sliding window according to a low bit depth;
determining a target low-bit-depth range from the low-bit-depth brightness histogram according to the target pixel;
extracting a partial original brightness histogram from the original brightness histogram according to the target low-bit-depth range; and
performing a histogram equalization process on the partial original brightness histogram according to the original bit depth to generate a final brightness value of the target pixel.

15. The non-transitory computer readable storage medium of claim 14, wherein the low bit depth is smaller than the original bit depth.

16. The non-transitory computer readable storage medium of claim 14, wherein the processor is further configured to perform following operations:
determining a plurality of boundary points and a local boundary point corresponding to at least one local minimum value according to the low-bit-depth brightness histogram;
determining a plurality of low-bit-depth ranges according to the boundary points and the local boundary point; and
determining the target low-bit-depth range from the low-bit-depth ranges according to a low-bit-depth brightness value of the target pixel.

17. The non-transitory computer readable storage medium of claim 14, wherein the processor is further configured to perform following operation:
performing a boundary adjustment process according to the original bit depth.

18. The non-transitory computer readable storage medium of claim 17, wherein the processor performs the boundary adjustment process according to:

$$S2 = S1 \times 2^{(N2-N1)} + (2^{(N2-N1)} - 1)$$

wherein S1 is a gray-scale value of a boundary point in the low-bit-depth brightness histogram, N2 is the original bit depth, N1 is the low bit depth, and S2 is a corresponding gray-scale value in the original brightness histogram.

* * * * *